Sept. 10, 1957 — E. A. ARP — 2,805,865
QUICK ACTING CHUCK
Filed Aug. 31, 1955 — 2 Sheets-Sheet 2
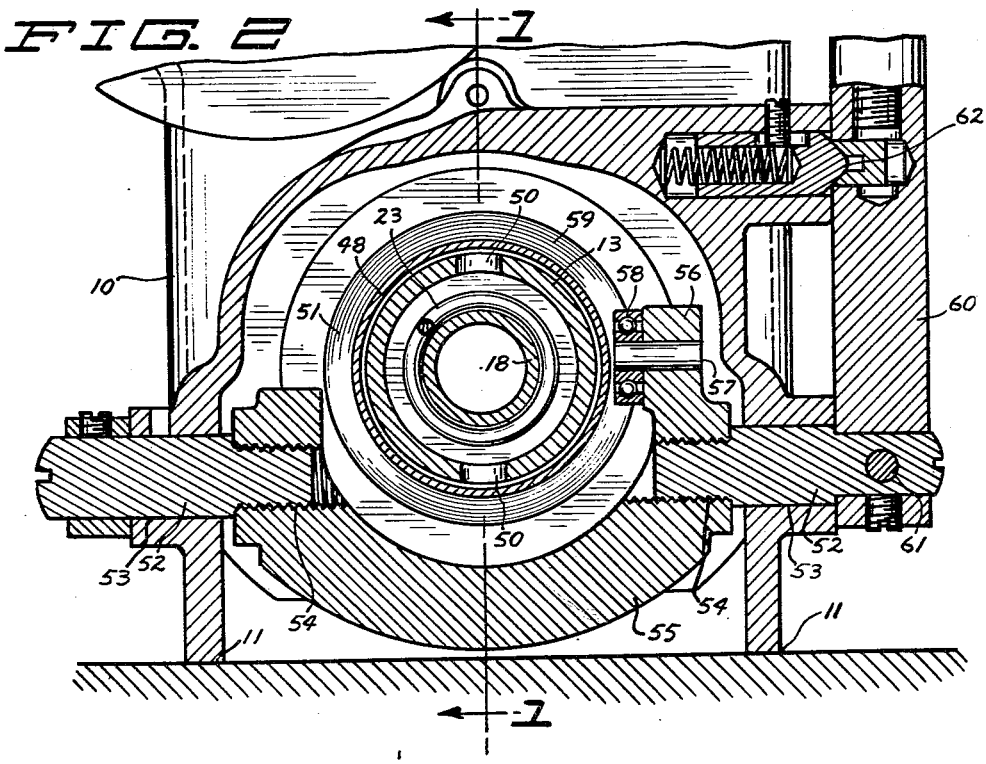
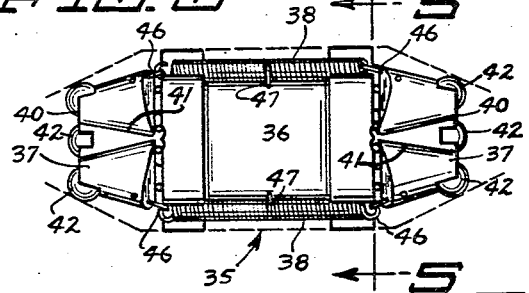
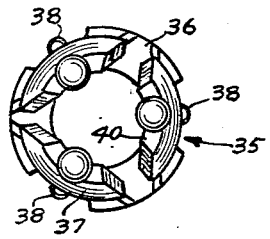
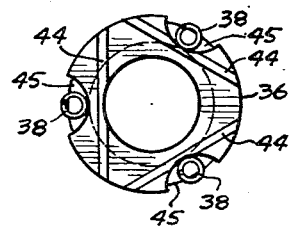
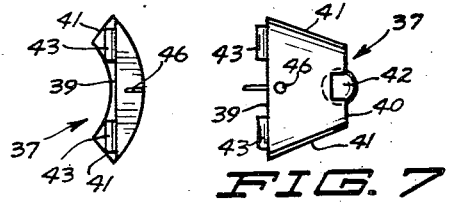
INVENTOR.
EWALD A. ARP
BY
Braddock and Braddock
ATTORNEYS United States Patent Office 2,805,865
Patented Sept. 10, 1957

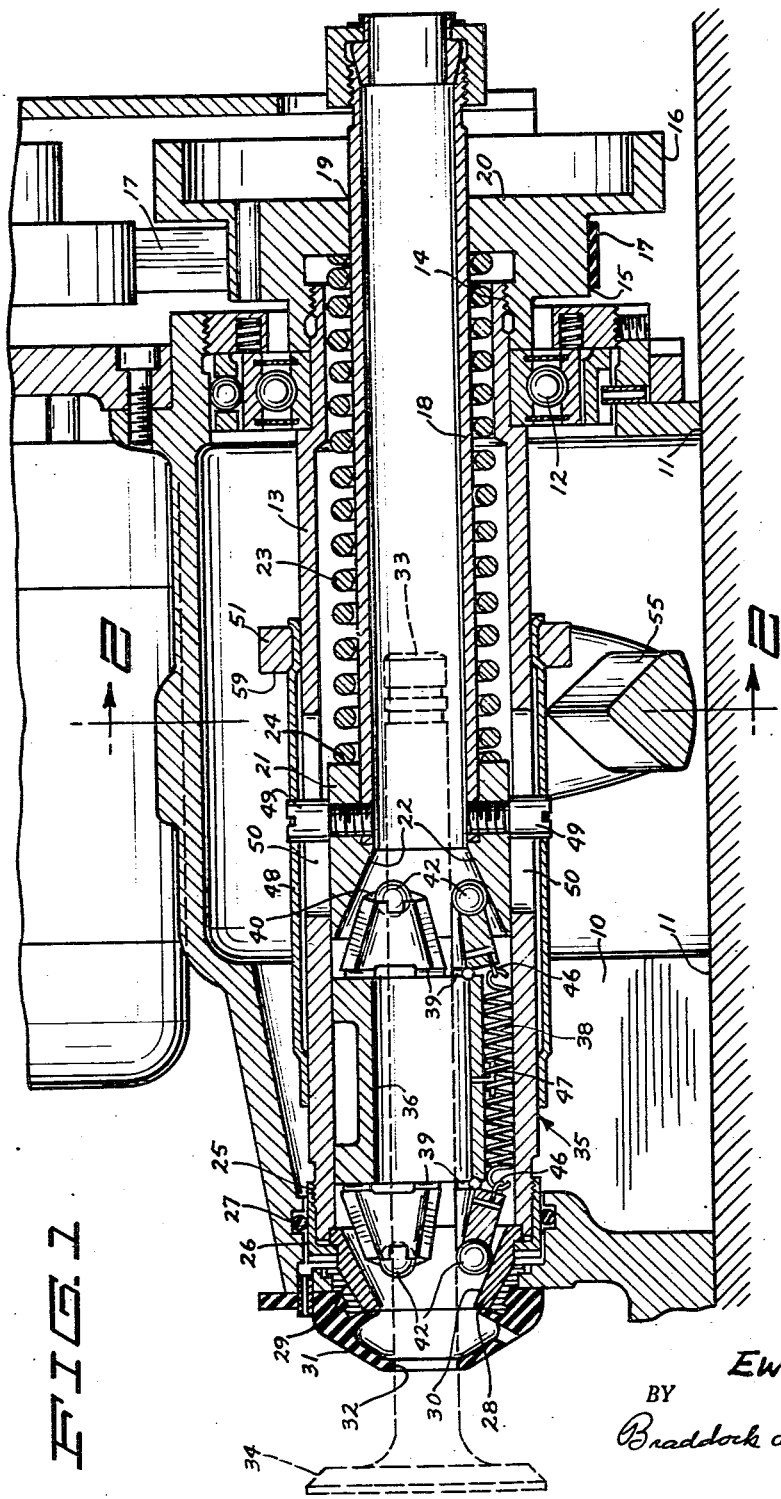

2,805,865

QUICK ACTING CHUCK

Ewald A. Arp, Minneapolis, Minn., assignor to Tobin-Arp Manufacturing Company, Minneapolis, Minn., a corporation of Minnesota Application August 31, 1955, Serial No. 531,778

13 Claims. (Cl. 279—51)

The invention herein has relation to a chuck which can be employed for various purposes, but which has been devised to be especially useful for grasping the stems of valves to be refaced.

In the accompanying drawings forming a part of this specification,

Fig. 1 is a longitudinal sectional view, taken as on line 1—1 in Fig. 2, of a chuck incorporating features and characteristics of the invention;

Fig. 2 is a transverse sectional view, taken as on line 2—2 in Fig. 1;

Fig. 3 is a side elevational view of a grasping unit of the chuck removed from the remainder thereof;

Fig. 4 is an end elevational view of said grasping unit;

Fig. 5 is an end elevational view of a cylindrical hollow body member of the grasping unit as said body member would appear from the position of line 5—5 in Fig. 4 with engaging devices of said grasping unit removed therefrom;

Fig. 6 is an edge elevational view of any one of a plurality of engaging devices of the grasping unit as it would appear from the left in Fig. 7; and Fig. 7 is a side elevational view of the engaging device disclosed in Fig. 6.

A frame 10, resting as at 11 on a supporting surface, rotatably supports, as by ball bearings 12, an exterior sleeve 13 of the new and improved chuck. The ball bearings retain the exterior sleeve against endwise movement.

An end of the exterior sleeve 13, the right end in Fig. 1 of the drawings, rigidly supports, as at 14, an assembly including a relatively small pulley 15 and a comparatively large pulley 16 to be driven, as by a belt 17, thus to cause said exterior sleeve to be rotated.

An interior sleeve 18, in spaced relation to and concentric with said exterior sleeve, is mounted centrally, as at 19, in the hub 20 of the pulley 15 for longitudinal sliding movement. One end portion of said interior sleeve extends to position beyond the pulley assembly at the side thereof opposite said exterior sleeve, and the other end portion of the interior sleeve is within and surrounded by the exterior sleeve.

A cylindrical portion 21 of a first hollow actuator of the chuck is slidably mounted in the external sleeve 13 and fixedly supported on the adjacent end of said inner sleeve, and a cone shape internal surface 22 of said first hollow actuator is in alined, concentric relation to the inner sleeve and faces in direction away from the pulley assembly. A compression coil spring 23, in surrounding relation to said inner sleeve and having its opposite ends seated against the hub 20 and an end surface 24 of the cylindrical portion 21 of the first hollow actuator, respectively, normally urges the inner sleeve and said first hollow actuator in the direction toward which the cone shape internal surface 22 faces, to the left in Fig. 1.

An end of the exterior sleeve 13, at the side of the first hollow actuator opposite the pulley assembly, fixedly supports, as at 25, a tubular element 26 rotatably mounted, as at 27, in the frame 10. A second hollow actuator 28 is suitably and conveniently fixedly supported, as at 29, on said tubular element and exterior sleeve, and a cone shape internal surface 30 of said second hollow actuator is in alined, concentric relation to the first hollow actuator and faces toward the cone shape internal surface 22. Said cone shape internal surfaces 22 and 30 are of identical size and configuration as disclosed, as well as in spaced relation and alinement longitudinally of the exterior and interior sleeves 13 and 18. A nipple 31 adjacent the second hollow actuator 28 includes a central opening 32 for receiving a stem 33 of a valve 34 to be refaced.

A grasping unit of the chuck, situated between the first and second hollow actuators, is constituted as a cylindrical hollow body member 36 snugly slidable longitudinally in the exterior sleeve 13, spaced engaging devices, each denoted 37, pivotally mounted upon each of the opposite ends of said hollow body member, and tension coil springs 38 connected between alined engaging devices at the opposite ends, respectively, of the hollow body member and resiliently urging said engaging devices to swing outwardly. As shown, there are three of the engaging devices 37 at each end of the hollow body member 36 spaced at 120 degrees apart, and all of said engaging devices are of duplicate construction.

As shown, each engaging device consists of a flat block, of curvilinear or arc shape in cross section, having parallel inner and outer surfaces, indicated 39 and 40, respectively, and converging side surfaces 41, 41, and a ball 42, for engaging the valve stem 33, rigid with a central portion of the outer end surface 40. A pair of alined lugs 43 on the inner end surface 39 of the block of each engaging device are fitted to a corresponding slot 44 in the adjacent end of the hollow body member thus to cause the engaging devices to be pivotally supported on said hollow body member for swinging movement toward and away from the valve stem 33. Slots 44 in the opposite ends, respectively, of the hollow body member are alined longitudinally thereof, and the slots and balls 42 at each end of said hollow body member are spaced at 120 degrees apart.

Longitudinal grooves, each represented 45, in the external surface of the hollow body member are spaced at 120 degrees apart, and there is a longitudinal groove 45 disposed exteriorly of and in adjacent relation to the midlengths of the slots 44 of each set of longitudinally alined slots. Each longitudinal groove contains a different one of the tension coil springs 38, and the opposite ends of each tension coil spring are secured, as at 46, to portions of the blocks of corresponding longitudinally alined engaging devices at the transverse centers thereof adjacent to and exteriorly of the inner surfaces 39 of said blocks. The midlengths of the tension coil springs 38 are secured, as by pins 47, in fixed relation to the external surface of the cylindrical hollow body member 36.

A cylindrical shell 48 is supported on the external surface of the exterior sleeve 13 for longitudinal sliding movement, and diametrically opposed screw bolts 49, in elongated slots 50 in said exterior sleeve, secure the cylindrical portion 21 of the first hollow actuator and the interior sleeve 13 to each other and also connect said cylindrical shell to said first hollow actuator and interior sleeve. The heads of the screw bolts 49 are fitted in openings in the shell 48, and the bodies of said screw bolts are fitted in openings in the first hollow actuator and the interior sleeve. The external surface of an end portion of the cylindrical shell 48, between the screw bolts 49 and the ball bearings 12, fixedly supports an annular member 51 which is rectilinear in cross section as shown.

A construction and arrangement for moving or sliding the first hollow actuator and the interior sleeve secured thereto in direction away from the grasping unit, against force of the compression coil spring 23, is disclosed in Fig. 2 of the drawings. Oppositely disposed trunnions 52, rotatably mounted, as at 53, in spaced walls of the frame 10 in perpendicular relation to the exterior and interior sleeves 13 and 18, fixedly support, as at 54, a swingable member 55 of arc shape at a lower portion of the frame in spaced relation to the exterior sleeve. An arm 56, rigid with the member 55 and extending upwardly from one of the trunnions 52, supports a shank 57 disposed in spaced relation to and parallelly of the trunnions. Said shank supports a roller 58 engageable against a surface 59 of the annular member 51 at the side thereof adjacent the grasping unit and opposite the pulley assembly. A hand piece 60 for rotatably actuating the arm 56 is secured, as at 61, to a projecting end of the adjacent trunnion. Means for detachably locking the hand piece in set position is denoted generally at 62.

The compression coil spring 23 normally resiliently urges the cone shape internal surface 22 of the first hollow actuator toward the cone shape internal surface 30 of the second hollow actuator, and the hand piece 60 is manually manipulable to forcibly move the roller 58 toward the right in Fig. 1 thus to move the first hollow actuator and the cone shape internal surface 22 thereof in direction away from the second hollow actuator and its cone shape internal surface 30.

In Fig. 1 of the drawings, the balls 42 of all of the engaging devices 37 are resiliently pressed against the external surface of the valve stem 33 under force exerted by the compression coil spring 23. The longitudinally alined, tapered internal surfaces 22 and 30 of the first and second hollow actuators converge in direction away from the grasping unit 35. The cylindrical hollow body member 36 is freely slidable in the exterior sleeve 13, and said compression coil spring exerts resilient pressure in equal amount to the engaging devices of each of the sets of engaging devices at each end of said hollow body member. The force of the compression coil spring causes all of the engaging devices to be confined to equal extent by the first and second hollow actuators and each of the balls 42 to be resiliently urged against a valve stem, such as 33, under the same pressure. The spaced sets of balls, at the opposite ends of the hollow body member, forced interiorly against tension of the coil springs 38, constitute spaced instrumentalities or means alined longitudinally of the chuck for rigidly retaining the stem of a valve, such as 34, to be refaced. During operation of the chuck, the exterior and interior sleeves 13 and 18, the grasping unit 35, the shell 48 and appurtenant parts rotate as a unit. Upon withdrawal of the first hollow actuator from the adjacent engaging devices, by manual manipulation of the hand piece 60, the tension coil springs 38 react to swing or move all of the engaging devices 37 exteriorly thus to be released from the valve stem.

What is claimed is:

1. In a chuck, an exterior member, a first hollow actuator longitudinally movable therein, a second hollow actuator in fixed relation to said exterior member and longitudinally alined with said first hollow actuator, a grasping unit between said first and second hollow actuators including a hollow body member slidable in said exterior member and spaced engaging devices upon each of the opposite ends of said hollow body member, and means for urging said first hollow actuator toward said second hollow actuator thus to bring the first and second hollow actuators into confining relation with respect to the engaging devices upon each of the opposite ends, respectively, of said hollow body member and force said engaging devices to be moved interiorly of said exterior member.

2. In a chuck, an exterior member, a first hollow actuator longitudinally movable therein, a second hollow actuator in fixed relation to said exterior member and longitudinally alined with said first hollow actuator, a grasping unit between said first and second hollow actuators including a hollow body member longitudinally slidable in said exterior member and spaced engaging devices upon each of the opposite ends of said hollow body member, each of the first and second hollow actuators including a tapered internal surface converging in direction away from said grasping unit, and means for urging said first hollow actuator toward said second hollow actuator thus to bring the first and second hollow actuators into surrounding confining relation with respect to the engaging devices upon each of the opposite ends, respectively, of said hollow body member and force said engaging devices to be moved toward each other.

3. In a chuck, an exterior member, a first hollow actuator longitudinally movable therein, a second hollow actuator in fixed relation to said exterior member and longitudinally alined with said first hollow actuator, a grasping unit between said first and second hollow actuators including a hollow body member longitudinally slidable in said exterior member and spaced, oppositely disposed engaging devices pivoted upon each of the opposite ends of said hollow body member for swinging movement toward and away from each other, each of the first and second hollow actuators including a tapered internal surface converging in direction away from said grasping unit, and means for urging said first hollow actuator toward said second hollow actuator thus to bring the first and second hollow actuators into surrounding confining relation with respect to the engaging devices upon each of the opposite ends, respectively, of said hollow body member and force said engaging devices to be swung toward each other.

4. In a chuck, an exterior member, a first hollow actuator longitudinally movable therein, a second hollow actuator in fixed relation to said exterior member and longitudinally alined with said first hollow actuator, a grasping unit between said first and second hollow actuators including a hollow body member longitudinally slidable in said exterior member, spaced, oppositely disposed engaging devices pivoted upon each of the opposite ends of said hollow body member for movement toward and away from each other and first means resiliently urging the engaging devices to be swung apart, each of the first and second hollow actuators including a tapered internal surface converging in direction away from said grasping unit, and second means for urging said first hollow actuator toward said second hollow actuator thus to bring the first and second hollow actuators into surrounding confining relation with respect to the engaging devices upon each of the opposite ends, respectively, of said hollow body member and force said engaging devices to be swung toward each other against the force of said first means.

5. The combination as specified in claim 1 wherein said means is resilient.

6. The combination as specified in claim 2 wherein said means is resilient.

7. The combination as specified in claim 3 wherein said means is resilient.

8. The combination as specified in claim 4 wherein said second means is resilient.

9. In a chuck, a rotatably supported exterior sleeve, an interior sleeve mounted in said exterior sleeve in spaced, concentric relation thereto for longitudinal sliding movement, a first hollow actuator rigid with said interior sleeve, a second hollow actuator in fixed relation to said exterior sleeve and longitudinally alined with said first hollow actuator, a grasping unit between said first and second hollow actuators including a hollow body longitudinally slidable in said exterior sleeve, spaced, oppositely disposed engaging devices pivoted upon each of the opposite ends of said hollow body for swinging movement toward and away from each other and means for resiliently urging the engaging devices to be swung apart, each of the first and second hollow actuators including a tapered internal surface converging in direction away from said grasping unit, and a compression coil spring for urging said interior sleeve to be slid and said first hollow actuator to be moved toward said second hollow actuator thus to bring the first and second hollow actuators into surrounding confining relation with respect to the engaging devices upon each of the opposite ends, respectively, of said hollow body and force said engaging devices to be swung toward each other against the force of said means.

10. In a chuck, an exterior member, first and second longitudinally alined hollow actuators in said exterior member, said first actuator being longitudinally movable toward and away from said second actuator, a grasping unit between said first and second hollow actuators including a body member having a longitudinal passageway therethrough and spaced engaging devices mounted upon the opposite ends, respectively, of said body member for free swinging movement to positions where alined with said passageway, and means for forcibly moving said first and second actuators toward each other and into confining relation to all of said engaging devices and the engaging devices to said positions where alined with said passageway.

11. In a chuck, an exterior member, first and second longitudinally alined hollow actuators in said exterior member, said first actuator being longitudinally movable toward and away from said second actuator, a grasping unit between said first and second hollow actuators including a body member having a longitudinal passageway therethrough and spaced engaging devices mounted upon the opposite ends, respectively, of said body member for free swinging movement to positions where alined with said passageway, each of the first and second hollow actuators including a tapered internal surface converging in direction away from said grasping unit, and means for forcibly moving said first and second actuators toward each other and into surrounding confining relation to the engaging devices upon each of the opposite ends, respectively, of said body member and all of said engaging devices to said positions where alined with said passageway.

12. The combination as specified in claim 10, and resilient means urging the engaging devices upon each of the opposite ends of the body member to be swung apart.

13. In a chuck, a rotatably supported exterior sleeve, an interior sleeve mounted in said exterior sleeve in spaced, concentric relation thereto for longitudinal sliding movement, a first hollow actuator rigid with said interior sleeve, a second hollow actuator fixed against longitudinal movement in said exterior sleeve and alined with said first hollow actuator, a grasping unit between said first and second hollow actuators including a body member having a longitudinal passageway therethrough and spaced engaging devices mounted upon the opposite ends, respectively, of said body member for free swinging movement to positions where alined with said passageway, resilient means urging the engaging devices upon each of the opposite ends of the body member to be swung apart, each of the first and second hollow actuators including a tapered internal surface converging in direction away from said grasping unit, and a compression coil spring for forcibly moving said first hollow actuator toward said second hollow actuator and into surrounding confining relation to the engaging devices upon each of the opposite ends, respectively, of said body member and all of said engaging devices to said positions where alined with said passageway.

References Cited in the file of this patent

UNITED STATES PATENTS

| | | |
|---|---|---|
| 287,761 | Gilbert | Oct. 30, 1883 |
| 442,230 | Libby | Dec. 9, 1890 |
| 1,011,975 | Lewis | Dec. 19, 1911 |
| 1,822,685 | Wilson | Sept. 8, 1931 |